US 9,098,571 B2

(12) United States Patent
Achuthan et al.

(10) Patent No.: US 9,098,571 B2
(45) Date of Patent: Aug. 4, 2015

(54) SYSTEMS AND METHODS FOR ANALYZING AND CLUSTERING SEARCH QUERIES

(75) Inventors: Sudhir Achuthan, Vienna, VA (US); Vineet Mahajan, Ashburn, VA (US); Sean C. Timm, Herndon, VA (US); Travis A. Walker, South Riding, VA (US); Sangchul Song, Aldie, VA (US)

(73) Assignee: AOL Inc., Dulles, VA (US)

( * ) Notice: Subject to any disclaimer, the term of this patent is extended or adjusted under 35 U.S.C. 154(b) by 49 days.

(21) Appl. No.: 13/357,385

(22) Filed: Jan. 24, 2012

(65) Prior Publication Data
US 2013/0024443 A1 Jan. 24, 2013

Related U.S. Application Data

(60) Provisional application No. 61/435,754, filed on Jan. 24, 2011.

(51) Int. Cl.
*G06F 17/30* (2006.01)

(52) U.S. Cl.
CPC .... *G06F 17/30693* (2013.01); *G06F 17/30392* (2013.01); *G06F 17/30646* (2013.01); *G06F 17/30657* (2013.01)

(58) Field of Classification Search
CPC .............. G06F 17/30392; G06F 17/30646; G06F 17/30657; G06F 17/30693
USPC .......................................... 707/722, 727, 728
See application file for complete search history.

(56) References Cited

U.S. PATENT DOCUMENTS

| 7,895,235 | B2 * | 2/2011 | Baeza-Yates et al. | 707/791 |
|---|---|---|---|---|
| 8,515,975 | B1 * | 8/2013 | Federici | 707/751 |
| 2002/0178093 | A1 | 11/2002 | Dean et al. | |
| 2004/0103426 | A1 | 5/2004 | Ludvig et al. | |
| 2006/0230058 | A1 | 10/2006 | Morris | |
| 2007/0043761 | A1 | 2/2007 | Chim et al. | |
| 2008/0010269 | A1 | 1/2008 | Parikh | |
| 2008/0256034 | A1 | 10/2008 | Chang et al. | |
| 2009/0083222 | A1 | 3/2009 | Craswell et al. | |
| 2009/0144129 | A1 | 6/2009 | Grouf et al. | |

(Continued)

FOREIGN PATENT DOCUMENTS

EP 2479686 A1 * 7/2012

OTHER PUBLICATIONS

Michael Higgins; "Origin of Anorthosite by Textural Coarsening: Quantitative Measurements of a Natural Sequence of Textural Development", Journal of Petrology, 1998, pp. 1307-1323.*

(Continued)

*Primary Examiner* — Monica Pyo
(74) *Attorney, Agent, or Firm* — Finnegan, Henderson, Farabow, Garrett & Dunner, LLP (57) ABSTRACT

Computerized systems and methods are disclosed for analyzing search query relationships and managing electronic content. In accordance with one implementation, log data pertaining to a plurality of queries may be received over an electronic network. A click graph may be generated representing one or more relationships between the queries. Further, temporal similarities may be identified between the queries, for example, by looking at peaks in frequency of queries over time. A pair of search queries may be evaluated based on the generated click graph and the identified temporal similarities to determine whether the queries in the pair are related.

30 Claims, 6 Drawing Sheets

(56) References Cited

U.S. PATENT DOCUMENTS

| | | | |
|---|---|---|---|
| 2009/0150223 A1 | 6/2009 | Sachedina | |
| 2009/0164895 A1 | 6/2009 | Baeza-Yates et al. | |
| 2009/0327057 A1 | 12/2009 | Redlich | |
| 2010/0100537 A1 | 4/2010 | Druzgalski et al. | |
| 2010/0185649 A1 | 7/2010 | Zhou et al. | |
| 2010/0198655 A1 | 8/2010 | Ketchum et al. | |
| 2010/0205131 A1 | 8/2010 | Kumar et al. | |
| 2010/0325133 A1* | 12/2010 | Rounthwaite et al. | 707/759 |

OTHER PUBLICATIONS

Gosink et al., "Query-Driven Visualization of Time-Varying Adaptive Mesh Refinement Data"; computer org.; published 2008; 8 pages.*

Qiankun Zhao et al.; "Time-Dependent Semantic Similarity Measure of Queries Using Historical Click-Through Data"; May 2006; 10 pages.*

Alonso, O. et al., Can we get rid of TREC assessors? Using Mechanical Turk for relevance assessment. In *SIGIR 2009 Workshop on The Future of IR Evaluation*, 2009.

Baeza-Yates, K. et al., Query recommendation using query logs in search engines. In W. Lindner, M. Mesiti, C. Türker, Y. Tzitzikas, and A. Vakali, eds., *Current Trends in Database Technology—EDBT 2004 Workshops*, vol. 3268 of *Lecture Notes in Computer Science*, pp. 395-397. Springer Berlin/ Heidelberg, 2005.10.1007/978-3-540-30192-9_58. (9 pages).

Beeferman, D. et al., Agglomerative clustering of a search engine query log. In *Proceedings of the sixth ACM SIGKDD international conference on Knowledge discovery and data mining*, KDD '00, pp. 407-416, New York, NY, USA, 2000. ACM. (9 pages).

Chien, S. et al., Immorlica. Semantic similarity between search engine queries using temporal correlation. In *Proceedings of the 14th international conference on World Wide Web*, WWW '05, pp. 2-11, New York, NY, USA, 2005. ACM. (9 pages).

Fonseca, B.M. et al., Using association rules to discover search engines related queries. In *Proceedings of the First Conference on Lating American Web Congress*, Washington, DC, USA, 2003. IEEE Computer Society. (6 pages).

Fuxman, A. et al., Using the wisdom of the crowds for keyword generation. In *Proceeding of the 17th international conference on World Wide Web*, WWW '08, pp. 61-70, New York, NY, USA, 2008, ACM. (10 pages).

Jones, R. et al., Beyond the session timeout: automatic hierarchical segmentation of search topics in query logs. In *Proceeding of the 17$^{th}$ ACM confrence on Information and knowledge management*, CIKM '08, pp. 699-708, New York, NY, USA, 2008. ACM (10 pages).

PCT International Search Report and Written Opinion dated Dec. 16, 2011 for PCT/US2011/044784, 8 pages.

Vlachos, M. et al., Identifying similarities, periodicities and bursts for online search queries. In *Proceedings of the 2004 ACM SIGMOD international conference on Management of data*, SIGMOD '04, pp. 31-142, New York, NY, USA, 2004. ACM (12 pages).

Wen, J.-R. et al., Clustering user queries of a search engine. In *Proceedings of the 10$^{th}$ international conference on World Wide Web*, WWW '01, pp. 62-168, New York, NY, USA, 2001. ACM. (14 pages).

Zhang, Z., et al., Mining search engine query logs for query recommendation. In *Proceedings of the 15$^{th}$ international conference on World Wide Web*, WWW '06, pp. 1039-1040, New York, NY, USA, 2006. ACM. (2 pages).

Office Action issued by the United States Patent and Trademark Office in U.S. Appl. No. 12/845,307, dated Jun. 18, 2012, 18 pages.

Office Action issued by the United States Patent and Trademark Office in U.S. Appl. No. 12/845,307, dated Nov. 2, 2012, 22 pages.

Office Action issued by the United States Patent and Trademark Office in U.S. Appl. No. 12/845,307, dated Apr. 12, 2013, 40 pages.

Office Action issued by the United States Patent and Trademark Office in U.S. Appl. No. 12/845,307, dated Sep. 18, 2013, 29 pages.

Extended European search report from the European Patent Office issued May 24, 2012, for counterpart European Patent Application No. 12000436.1 (7 pages).

* cited by examiner

SYSTEMS AND METHODS FOR ANALYZING AND CLUSTERING SEARCH QUERIES

This application claims the benefit of U.S. Provisional Application No. 61/435,754, filed Jan. 24, 2011, which is expressly incorporated herein by reference to its entirety.

TECHNICAL FIELD

The present disclosure generally relates to analyzing search queries and managing electronic content. More specifically, and without limitation, the present disclosure relates to computerized systems and methods for analyzing and clustering search queries, such as queries logged by a web search engine. The exemplary embodiments disclosed herein also relate to click graphs for analyzing pairs of search queries, as well as temporal analysis of search queries.

BACKGROUND

Currently, newspapers, magazines, and other publishers of timely textual and visual content are increasingly competing with online websites for the public's attention. Online websites that generate content (so-called "content sites") often employ writers or "bloggers" to generate articles, podcasts, videos, and other content regarding topics that are popular at that moment. These content sites face challenges in generating the quantity and diversity of content that is desired by the public and necessary to obtain sufficient web traffic and associated advertising revenue.

Some types of online content can have a low "shelf-life," in that it can be rendered out-of-date by current events or new conventional wisdom. Online content also faces tremendous levels of competition. While traditional media only competed against a finite number of peer publications and broadcasts, new online media faces competition from thousands, or even hundreds of thousands, of websites. As a result, it is important for providers of online content to generate very large volumes of content. It can be useful to continuously generate large amounts of content about a topic to ensure that it is timely and up-to-date, as well to ensure that such content is distributed and displayed throughout the Internet, where it is likely to be consumed by online users.

In addition to the interest of generating large quantities of content, in many cases it is important for online content providers to focus on high-quality content. The above-referenced excess of competition means that online users can easily turn elsewhere if they perceive that online content is low in quality. The quality of content is also important because of the way that users find and browse content online. Many search engines deliver web pages to users based on the level of positive feedback exemplified by linking from other websites, positive comments, thumbs-ups, etc. Therefore, favorably-received content will be higher-ranked by search engines, and more likely to be displayed to users.

The need for large quantities of high-quality content is not easily satisfied by a traditional staff of editors and writers. The amount of online data received on user preferences/history, page performance, reviews, etc. is just too overwhelming for any group of people to efficiently process and leverage. The amount of content that should be generated based on high-demand topics is also too large for the limited staff of a company to create in a high-quality manner. Furthermore, even the most experienced editors are not always able to determine what online content will become most highly-sought-after, and calculate the monetary value of such online content.

The present disclosure is directed to addressing one or more of the above-referenced challenges by providing improved systems and methods for analyzing query relationships and managing electronic content. Among other features and advantages, the disclosed embodiments include determining topics in high demand by, among other things, generating click graphs and performing temporal clustering of search queries. The disclosed embodiments may be used to, for example, calculate the interest or value of electronic content, and request electronic content from users, such as over the Internet.

SUMMARY

Consistent with the present disclosure, systems and methods are provided for analyzing search query relationships and managing electronic content. Embodiments consistent with the present disclosure include, for example, systems and methods for evaluating and identifying query relationships based on click graphs representing relationships between queries and visited query results. The disclosed systems and methods may also evaluate and identify query relationships based on temporal similarities between queries.

In accordance with one disclosed exemplary embodiment, a computer-implemented method is provided for analyzing search query relationships. According to the method, log data is stored in a storage medium. The log data relates to a plurality of search queries and may be received over an electronic network. Using a processor, a click graph may be generated representing a relationship between at least one pair of the plurality of queries. Further, temporal similarities may be identified between the at least one pair of the plurality of queries. The at least one pair of queries may then be evaluated based on the generated click graph and the identified temporal similarities to determine whether the at least one pair of queries are related.

In accordance with another exemplary embodiment, a computer-implemented system is provided for analyzing query relationships. The system includes a server and a processor. The server may be configured to receive and store log data pertaining to a plurality of queries from Internet users over an electronic network. The processor may be configured to generate a click graph representing a relationship between at least one pair of the plurality of queries. Further, the processor may be configured to identify temporal similarities between the at least one pair of the plurality of queries. The at least one pair of queries may then be evaluated based on the generated click graph and the identified temporal similarities to determine whether the at least one pair of queries are related.

According to still another exemplary embodiment, a computer readable medium is provided including instructions for analyzing search query relationships. When executed, the instructions perform steps including receiving log data pertaining to a plurality of queries from Internet users over an electronic network. The steps further include generating a click graph representing a relationship between at least one pair of the plurality of queries. Moreover, temporal similarities may be identified between the at least one pair of the plurality of queries. The at least one pair of queries may be evaluated based on the generated click graph and the identified temporal similarities to determine whether the at least one pair of queries are related.

Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and computer-implemented systems. The computer-implemented methods may be executed, for example, by a processor that receives instructions from a non-transitory computer-readable storage medium. Similarly, the systems disclosed herein may include at least one processor and memory, and the memory may be a non-transitory computer-readable storage medium.

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums.

As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 1:
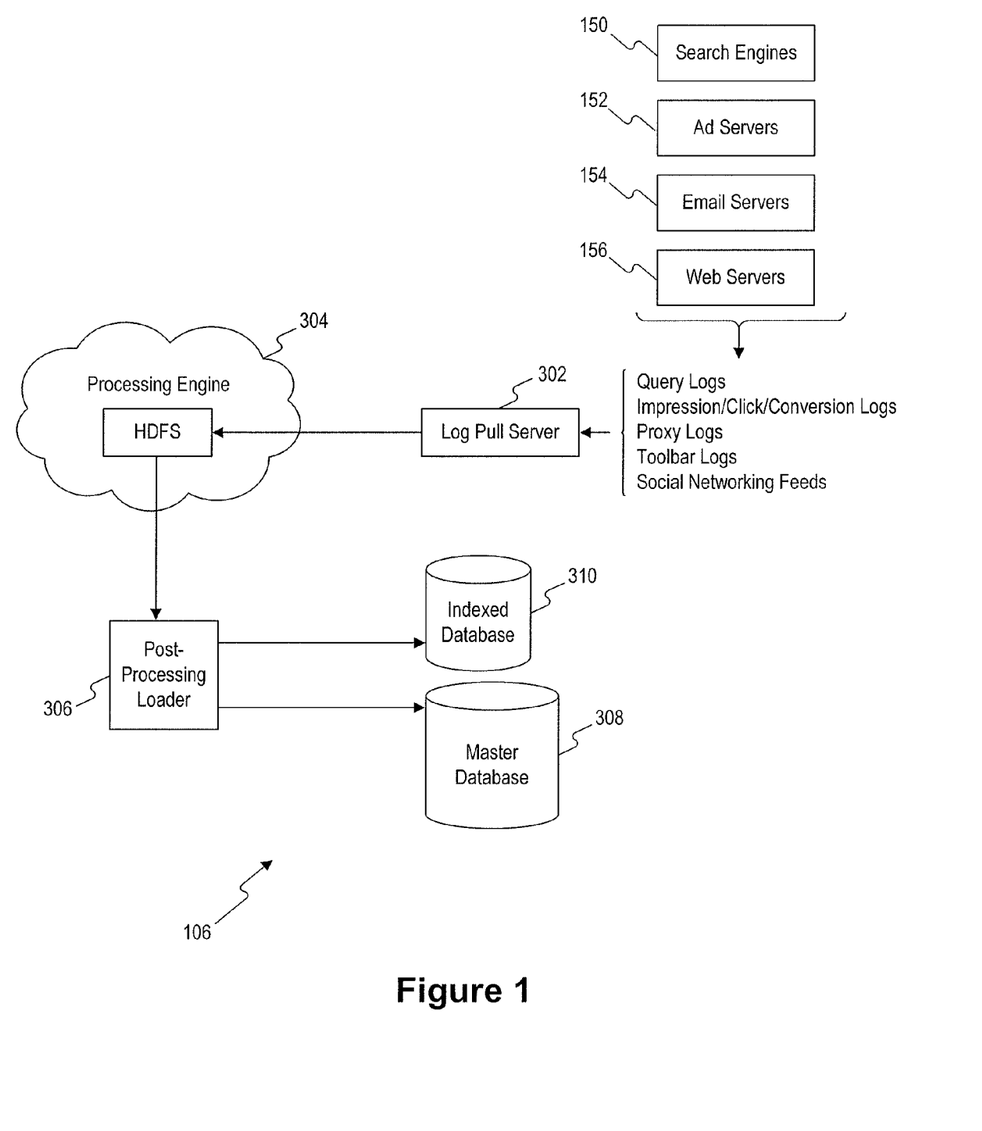
FIG. 1 illustrates an exemplary system environment for implementing embodiments of the present disclosure.
Figure 6:
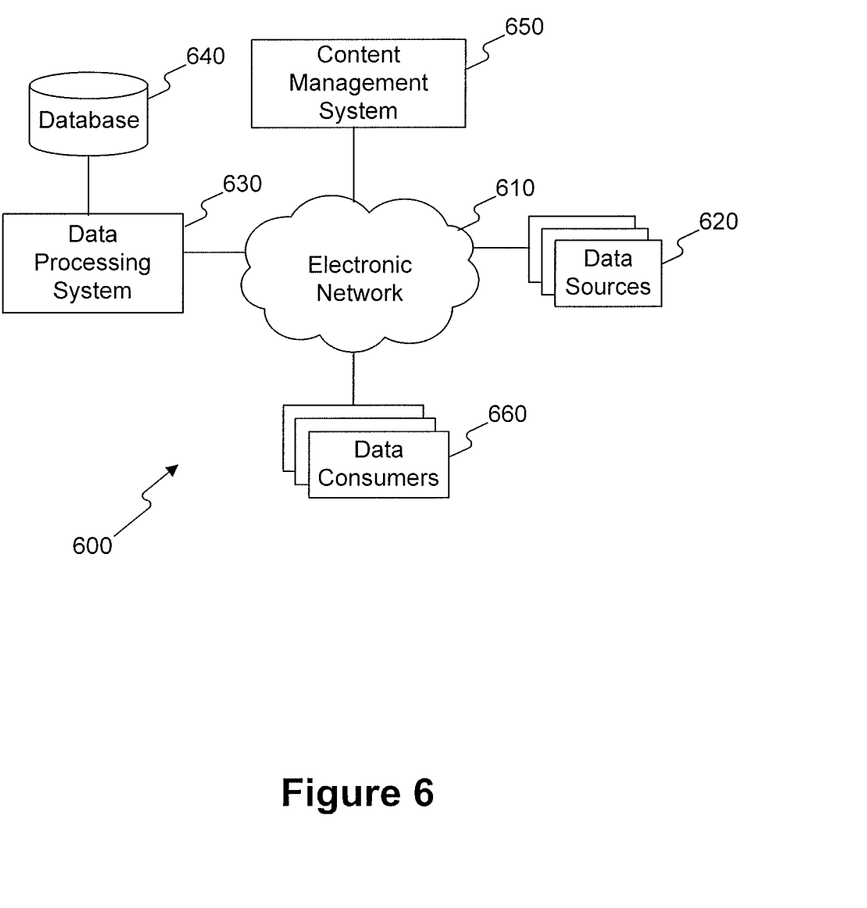
FIG. 6 illustrates another exemplary system environment for implementing embodiments of the present disclosure.

FIGS. 1 and 6 illustrate exemplary system environments for implementing embodiments of the present disclosure. In the exemplary embodiment of FIG. 1, a system 106 is provided. System 106 may include an arrangement of components and be implemented with or as part of a content management system. Examples of content management systems include systems such as that described in U.S. patent application Ser. No. 12/845,307, filed on Jul. 28, 2010, the disclosure of which is incorporated herein by reference.

Consistent with the present disclosure, system 106 may be configured to perform methods for analyzing search query relationships, such as those described herein. Among other things, system 106 may be implemented to generate click graphs and perform temporal clustering of search queries in order to, for example, identify content topics in high demand. As disclosed herein, a "click graph" may be interpreted to include any representation of the relationship between two or more search queries and the URLs for websites visited by users upon submission of those search queries.

System 106 may include one or more server systems, databases, and/or computing systems configured to receive information from entities in a network, process the information, and/or communicate the information with other entities in the network, according to the exemplary embodiments described herein. More specifically, system 106 may be configured to store data received over a network such as the Internet, process/analyze the data to identify content topics of interest to users of the Internet, and present the processed/analyzed data to, for example, editors through an editor portal and/or to contributors in the form of content requests.

In one embodiment, various components of system 106 may include an assembly of hardware, software, and/or firmware, including a memory, a central processing unit ("CPU"), and/or a user, interface. Memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

In accordance with certain embodiments, system 106 may operate and/or coordinate with one or more search engines 150, one or more ad servers 152, one or more emails servers 154, and/or one or more web servers 156, for the purpose of providing web portals, content sites, toolbars, webmail systems, etc. for consumers or other users of the Internet. In one embodiment, system 106 may acquire or form agreements to acquire or otherwise receive data from components 150, 152, 154, and/or 156. Search engines 150, ad servers 152, emails servers 154, and/or web servers 156 may be configured to generate or gather various forms of data, including query logs (i.e., data about search queries), impression/click/conversion logs (i.e., data about views, clicks, and purchases associated with various ads or websites), proxy logs (i.e., data about searches, web interaction, and/or user information collected from a web portal offered by the operator of CMS systems), toolbar logs (i.e., data about searches, web interaction, user information collected from a browser toolbar), and social networking feeds (i.e., data generated from a social networking web server). In one embodiment, query logs generated by search engines 150 may be used for analyzing query relationships, as described herein. The query logs alone or in combination with the impression/click/conversion logs, proxy logs, toolbar logs, and social networking feeds may reflect the activities of users on the Internet and provide a broad source of information about content topics of interest on the Internet.

In one embodiment, system 106 may include a log pull server 302, which may be configured to receive and store query logs, impression/click/conversion logs, proxy logs, toolbar logs, and/or social networking feeds from search engines 150, ad servers 152, email servers 154, and/or web servers 156. Log pull server 302 may compile such information and send it to processing engine 304 for processing and analytics.

In one embodiment, processing engine 304 may comprise a Hadoop cluster including a Hadoop distributed file system ("HDFS") that is configured to stage input data, perform data processing, and store large-volume data output. It will be appreciated that the HDFS may include any desired number or arrangement of clustered servers or machines, as needed to provide suitable efficiency, storage space, and/or processing power. Although certain embodiments of the present disclosure are described with reference to a Hadoop cluster, it will be appreciated that any type of processing system may be used in the alternative.

In one embodiment, processing engine 304 may be configured to perform methods for generating a click graph and performing temporal clustering of search queries, as will be described in more detail herein. In addition, processing engine 304 alone or in combination with other components may be implemented to generate output or reports including trends and other demand data.

Referring again to FIG. 1, system 106 may also include a post-processing loader 306. Post-processing loader 306 may include one or more servers, such as a trends loader server, configured to receive output from the processing performed by processing engine 304 and send such output to a master database 308 and/or indexed database 310. Master database 308 may be any suitable type of large scale data storage device, which may optionally include any type or combination of slave databases, load balancers, dummy servers, firewalls, back-up databases, and/or any other desired database components. In one embodiment, indexed database 310 may be implemented as Solr/Tomcat databases, and/or any other enterprise search servers. For example, indexed database 310 may include a contextual index, such as a Lucene/Solr distributed index, Sphinx distributed index, or Lemur/Indri distributed index. These components may be used for indexing of text content. Although not necessary, for performance reasons, it may be desired to limit or control the size of individual index shards such that each shard can be stored in main memory on its node. Indexed database 310 may also be distributed MySQL servers (e.g., servers on multiple nodes used for partitioning or replication purposes). In one exemplary embodiment, the indexed database 310 may be single-node MySQL servers used to store medium-sized data sets for analysis, reporting/presentation, and other purposes. The data stored in such a server may be used to build an interface directed towards APIs of demand consumers, demand analysts, and/or business and sales entities.

It will be appreciated that any suitable configuration of software, processors, and data storage devices may be selected to carry out the disclosed features and aspects of system 106. The software and hardware associated with system 106 may be selected to enable quick response to various business needs, relatively fast prototyping, and delivery of high-quality solutions and results. An emphasis may be placed on achieving high performance through scaling on a distributed architecture. The selected software and hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

In accordance with certain embodiments, processing engine 304 may perform various methods for generating click graphs and performing temporal clustering of search queries. By combining the outputs generated by these two approaches to determining query relatedness, one may greatly expand the coverage of related queries obtained while also maintaining a sufficiently high degree of relevance among the queries.

As is well understood, a user interested in obtaining information about a given topic from the Internet, may enter a query consisting of one or more search terms into a search engine. The search engine (e.g., one of search engines 150) may take the query input by the user and analyze the query to determine a number of search results that it deems relevant to the user query. These results may be presented to the user in the form of a list of web pages, along with summaries for each page, which the user may utilize to better determine the relevance of each result to the user's particular interests. Further, a portion of each result (e.g., the title) may be presented to the user in the form of a hyperlink. A hyperlink is a user-selectable item that may be used to link a user to a web resource. For example, the title of a web page listed in the search results may be hyperlinked, such that the user viewing the search results may click on the title of the web page and be transferred to that page without having to manually enter in the uniform resource locator (URL), or web address, associated with that web page.

Web searches often yield a number of irrelevant results. In order to determine whether a search result is pertinent to the user's interests, the user may review a summary of the result (e.g., web page) presented along with the hyperlink to the result. If, based on the summary (or otherwise), the user determines that a particular web page listed in the search results is likely to provide information of interest to the user, the user may click on hyperlink associated with the search result, so that the user may review the web page. If the user determines that the search result appears unlikely to provide any information of interest to the user, the user may skip over the search result in favor of other more promising results. Because search results often contain such a large number of results as to prohibit an exhaustive review or each, and, more specifically, because many results may not be directly pertinent to the user's interests/query, a user may choose to explore further only a small percentage of the results. In other words, a user may click on only a few of the search results that the user deems most promising and leave the rest of the search results unexplored.

During the process of seeking to obtain information on a topic, a user may perform several search queries. For example, if a user performs a search query using a few general search terms or keywords relevant to a topic of interest, the user may obtain many topics that are only tangentially relevant to the user's particular interest in the topic. In order to obtain results that are more relevant to the user's particular interests, the user may add some more specific search terms to the query or perform a query consisting of entirely different search terms altogether. A user who performs several search queries using related, but different, search terms may notice that a subset of search results appear in the search results associated with each of the search queries. Similarly, different users who seek to obtain similar information on a given topic may enter in different search queries when attempting to seek that information.

By analyzing the results that each of the users chooses to explore in more detail (e.g., the results/hyperlinks that each user selects/clicks), one may determine that two or more search queries are related. In other words, if two users arrive at and explore (e.g., click the hyperlinks associated with) the same search results, the queries that the users entered to obtain those search results are likely to be related.

Figure 2:
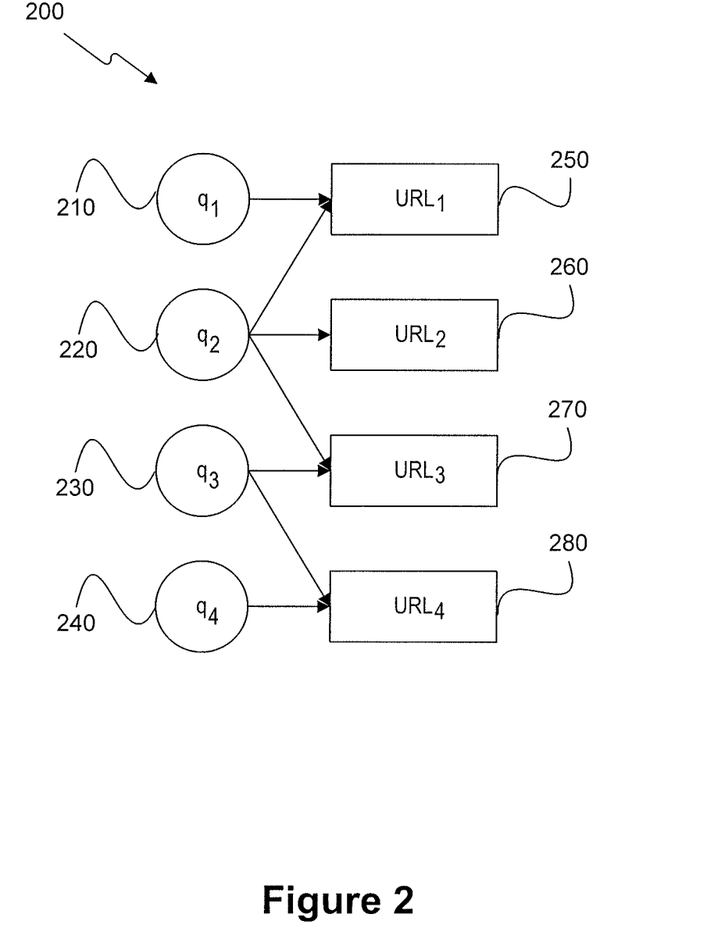
FIG. 2 illustrates an exemplary click graph, in accordance with an embodiment of the present disclosure.

A query-URL bipartite graph, or click graph, may utilize information regarding the search results that users choose to explore (e.g., click on) to determine and represent relationships among two or more queries. FIG. 2 depicts an exemplary click graph, in accordance with an embodiment of the present disclosure.

As shown in FIG. 2, a click graph 200 may comprise a number of objects. In accordance with an embodiment, these objects represent at least three elements: search queries; individual query results; and links representing the relationships between the queries and results. The objects on the left side of FIG. 2 represent exemplary search queries 210, 220, 230, and 240 (e.g., queries q1, q2, q3, and q4, respectively). The objects on the right of FIG. 2 represent exemplary query results 250, 260, 270, and 280 (e.g., web pages). Connecting the queries and results are a number of links, which indicate which results from a given result set were selected (or clicked) by a user. For example, the three lines connecting query 220 to results 250, 260, and 270 indicate both that query 220 resulted in a results set containing query results 250, 260, and 270, and that a user clicked on each of those results. In addition to results 250, 260, and 270, query 220 may have resulted in a number of additional query results (not shown) that the user chose not to click (e.g., because the summaries of those results indicated that they were not likely relevant to the user's interest). Tracking the query results that a user actually clicks, rather than all results of a given query, can provide a better representation of the user's interests. Moreover, narrowing the focus of an analysis on query relatedness to only those results that are clicked may be more manageable than other more expansive approaches when correlating the results of a large number of search queries (e.g., many queries performed by many users).

The information presented in a click graph may be used to identify relationships between two or more search queries. For example, a click graph may show that there is substantial overlap between the clicked results of two different queries. In other words, a click graph may indicate that two users who perform two separate queries consisting of two separate sets of search terms obtain and click many of the same search results. Again, the click graph shows not only that the results retrieved by a search engine are similar for the two queries, but also that the users chose to navigate to the same, or similar, results, indicating an even stronger relationship between the queries than mere analysis of search results may show.

Although similar lists of clicked search results may indicate that two search queries are related, the extent of this relationship may not always be clear. Further, if the clicked search results of a first query are similar to the clicked search results of both a second and a third query, it may not be clear which of the second and third search queries is more related to the first search query. The association between a query and a query result may vary due to a variety of factors, such as the volume of results, number of total clicks by a user from those results, and number of unique URLs in each result set. Accordingly, a query relatedness analysis may extend beyond the mere observation that similarities exist between clicked search results to take into consideration these other factors.

In accordance with one embodiment, the first layer query-click graph similarity between two queries $q_a$ and $q_b$ may be defined as follows:

$$L1\text{Sim}(q_a, q_b) = \Sigma_{k=1}^{m}(w_{ak} + w_{bk}),$$

where m is the total number of URLs (e.g., results), and $w_{ak}$ (or $w_{bk}$) is the edge weight between $q_a$ ($q_b$) and $\text{URL}_k$ given by:

$$w_{ak}(w_{bk}) = \frac{\text{The Number of Clicks to } URL_k \text{ from } q_a (q_b)}{\text{Total Clicks from } q_a (q_b)}.$$

Because $w_{ak}$ is equal to zero when $q_a$ and $\text{URL}_k$ do not have a connecting edge, the actual computation involves only the URLs that are shared by $q_a$ and $q_b$. The similarity measure above results in values between zero and two, where $L1\text{Sim}(q_a, q_b)=2$ means that two queries share exactly the same set of URLs, and $L1\text{Sim}(q_a, q_b)=0$ means that there are no shared URLs between the two queries. In other words, if the first layer query-click graph similarity function produces a value of 2 for a pair of queries, then the set of query results that users clicked from each result set in that pair was exactly the same. If the value produced by the first layer similarity function is 0 for the pair of queries, then there was no overlap in the sets of clicked results from the queries (i.e., none of the clicked results from the first query were clicked results in the second query and vice versa).

Although a higher layer one similarity ($L1\text{Sim}(q_a, q_b)$) is usually a good indicator of the relatedness of two queries, it may not be sufficient by itself for related query discovery; it has a positive value only if there exists at least one URL (e.g., clicked result) appearing in search results for both queries ($q_a$ and $q_b$). Thus, the precision of the resulting related query determinations will be high, but the recall may not be high. Accordingly, query relatedness using query-URL bipartite graph (i.e., click graph) analysis may be extended beyond layer one similarity of search queries to analysis of similarity of those queries at layers two and three.

As discussed above, layer one analysis evaluates query relatedness based on the number of URLs (i.e., clicked results) that are shared between the result sets of two queries. Analysis of query relatedness at layers two and three may be used to determine relatedness of queries based on indirect relationships. Specifically, layer two analysis seeks to determine whether there exists a third query whose result set overlaps with the result sets of both the first and second queries. Thus, although the result sets of two queries do not overlap, the queries may nevertheless be determined to be related if there exists some other query whose result set overlaps with the result sets of both queries. Layer three analysis extends this idea one step further to add an additional layer of consideration.

These three layers of query relationship analysis may be summarized as follows:

L1 Relation: $q_a$ and $q_b$ are L1-related if $L1Sim(q_a, q_b) > 0$.

L2 Relation: $q_a$ and $q_b$ are L2-related if $L1Sim(q_a, q_b) = 0$, and there exists $q_x$ such that $L1Sim(q_a, q_x) > 0$ and $L1Sim(q_x, q_b) > 0$. $L2Sim(q_a, q_b)$ may be defined as follows: $L2Sim(q_a, q_b) = MIN(L1Sim(q_a, q_x), L1Sim(q_x, q_b))$. When there are more than one $q_x$ that satisfy the condition, the $q_x$ that yields the largest $L2Sim(q_a, q_b)$ is the one evaluated.

L3 Relation: $q_a$ and $q_b$ are L3-related if $L1Sim(q_a, q_b) = 0$ and $L2Sim(q_a, q_b) = 0$, and there exists $q_x$ such that $(L1Sim(q_a, q_x) > 0$ or $L2Sim(q_a, q_x) > 0)$ and $(L1Sim(q_x, q_b) > 0$ or $L2Sim(q_x, q_b) > 0)$. $L3Sim(q_a, q_b)$ may be defined as follows: $L3Sim(q_a, q_b) = MIN (MAX(L1Sim(q_a, q_x), L2Sim(q_a, q_x)), MAX(L1Sim(q_x, q_b), L2Sim(q_x, q_b)))$. When there are more than one $q_x$ that satisfy the condition, the $q_x$ that yields the largest $L3Sim(q_a, q_b)$ is the one evaluated.

Layer two and layer three analyses may capture far more query relations than layer one analysis, resulting in higher recall. These analyses, however, tend to be much noisier than layer one analysis, resulting in much lower precision. Accordingly, to counterbalance the noisiness of layer two and three analysis, one may combine other forms of query relationship analysis along with these forms of analysis to obtain more precise results. One such form of analysis that may be considered along with query-URL bipartite graph analysis, whether at layer one, layer two, or layer three, is temporal frequency analysis.

Temporal frequency analysis is a method of analyzing the relationships between queries that focuses on the timing of search queries. The idea behind this form of analysis is that two or more search queries may be more likely to be related if the search queries tend to be performed around the same time as one another. For example, queries for "cooking time for turkey" and "gravy for turkey" may be determined to be related to one another when a number of searches containing those terms are performed within a narrow time period (e.g., the days or hours leading up to a Thanksgiving meal). The likelihood that a relationship exists between these queries may be increased if spikes in the number of queries performed containing these terms occur together multiple times or, more specifically, at a given time each day, week, or year (e.g., each Thanksgiving).

Figure 3:
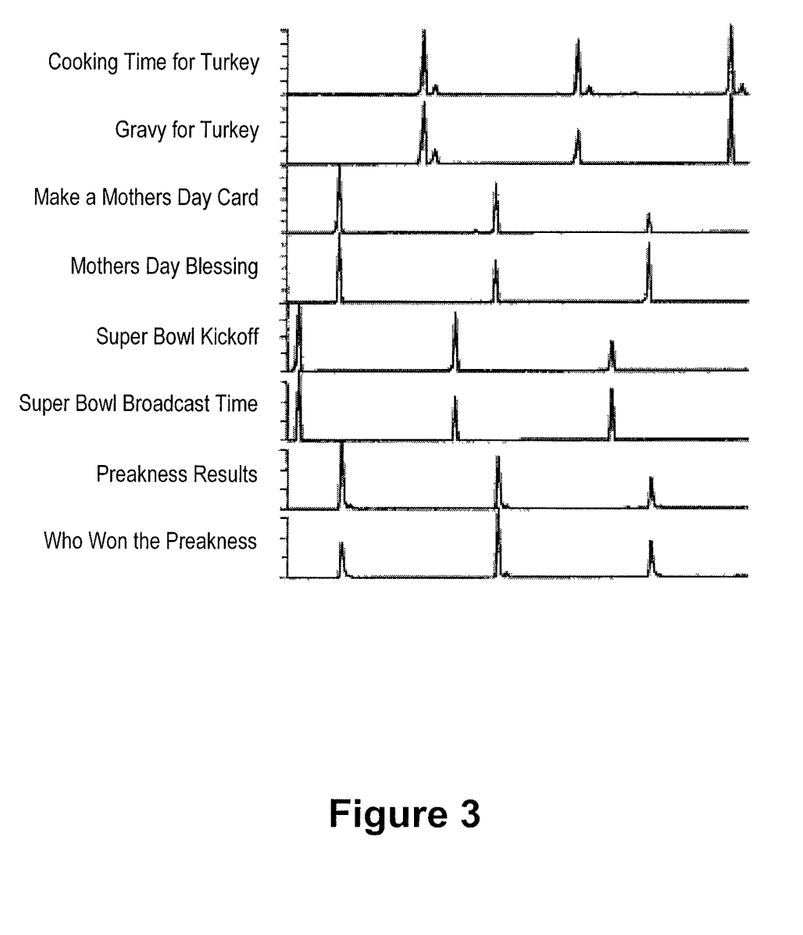
FIG. 3 illustrates exemplary graphs demonstrating temporal similarities between pairs of queries, in accordance with an embodiment of the present disclosure.

FIG. 3 illustrates exemplary graphs demonstrating temporal similarities between pairs of queries, in accordance with an embodiment of the present disclosure. FIG. 3 includes a series of graphs showing the outputs of exemplary temporal query frequency analyses in accordance with an embodiment. In FIG. 3, time is represented by the x-axis of each graph and the quantity of queries received is represented by the y-axis. The two exemplary queries discussed above are presented as the top two graphs of FIG. 3.

As shown in FIG. 3, the number of queries received for "Cooking Time for Turkey" spiked at the same time as the number of queries received from "Gravy for Turkey" spiked. Other relationships between queries may be identified from the graphs presented in FIG. 3 as well. Specifically, FIG. 3 indicates relationships between the queries "Make a Mothers Day Card" and "Mothers Day Blessing," between "Super Bowl Kickoff" and "Superbowl Broadcast Time," and between "Preakness Results," and "Who Won the Preakness."

In conducting a temporal similarity measurement, one may consider, for each query, time series $q: \{f_0, f_1, f_2, f_{n-1}\}$ where $f_t$ is the query frequency at time t. For two queries $q_a$ and $q_b$, one may compute the Euclidean distance between $q_a$ and $q_b$, treating each time-series as a vector in the n-dimensional vector space. This simple approach however may lead to a number of problems, including:

Problem One: Two queries with the same periodicity can still be considered different if their amplitudes are different.

Problem Two: If n is too large, it can be computationally demanding.

Problem Three: Since every dimensional axis is orthogonal to other axes, temporal proximity of peaks is not factored in. For example, consider three queries $q_a$, $q_b$, and $q_c$ that peak at $t_1$, $t_2$, and $t_{70}$, respectively, forming exactly the same shape otherwise. $q_a$ and $q_b$ will not be considered closer than $q_a$ and $q_c$.

Figure 4:
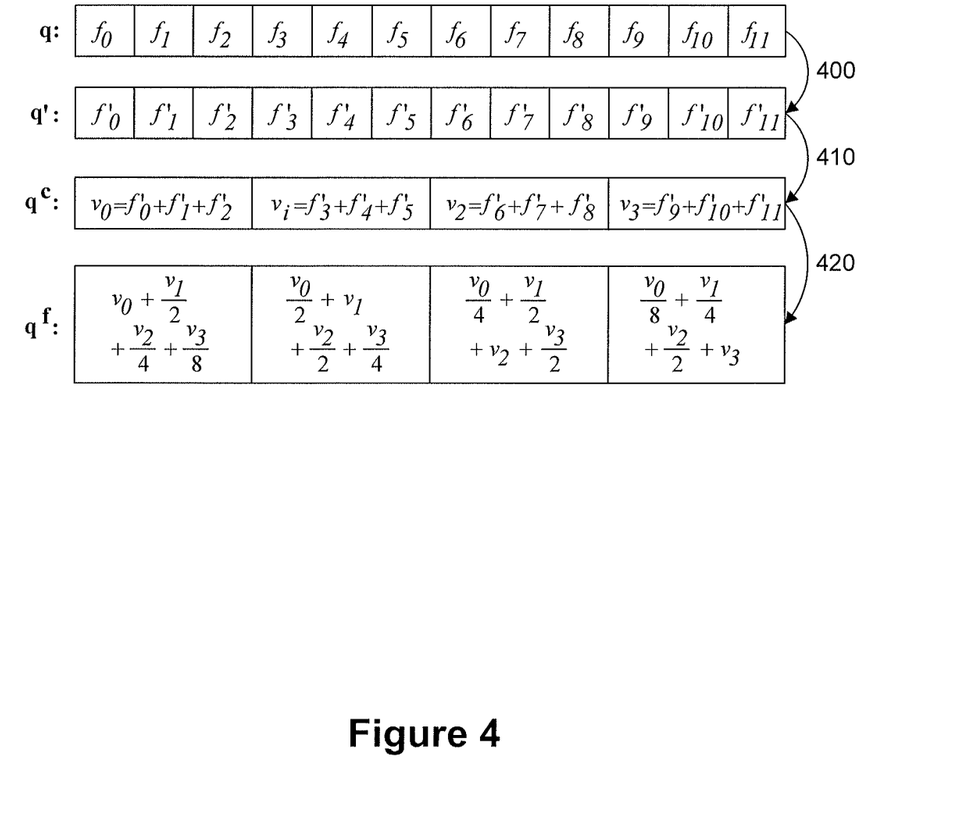
FIG. 4 illustrates exemplary steps for processing a time series representing query frequency, in accordance an embodiment of the present disclosure.

FIG. 4 is a diagram illustrating steps for processing a time series representing query frequency, in accordance an embodiment of the present disclosure. Stated another way, FIG. 4 depicts an exemplary method by which the above problems may be addressed.

First, in step 400, the original time-series is normalized to zero mean and unit variance, $q': \{f'_0, f'_1, f'_{n-1}\}$, where $$f'_i = \frac{f_i - \mu}{\delta},$$

thus addressing Problem One. Problem Two and Problem Three may be alleviated by coarsening and flattening the query frequency graph in accordance with steps 410 and 420, respectively. In step 410, the time granularity may be coarsened by converting q' into $q^c: \{v_0, v_1, v_2, v_{k-1}\}$ where k<n as follows:

$$v_i = \Sigma_{j=0}^{(n/k)-1} f'_{((n/k) \times i + j)}.$$

The coarsening process may reduce the dimensionality and also help favor queries that have peaks closer in time, as close peaks are likely to be coarsened into the same time bucket. Although the coarsening process may help factor in temporal proximity of peaks, flattening may be performed in step 420 to further assist with this process. Specifically, $q^c$ may be flattened into $q^f: \{v'_0, v'_1, v'_2, v'_{k-1}\}$ by spilling values in $q^c$ into the neighbors, creating $q^f: \{v'_0, v'_1, v'_2, v'_{k-1}\}$ as follows:

$$v'_i = \frac{v_{i-3}}{8} + \frac{v_{i-2}}{4} + \frac{v_{i-1}}{2} + v_i + \frac{v_{i+1}}{2} + \frac{v_{i+2}}{4} + \frac{v_{i+3}}{8},$$

for $0 \leq i < (k-1)$ where $v_{-3} = v_{-2} = v_{-1} = v_k = v_{k+1} = v_{k+2} = 0$.

Once $q_f$ is obtained, the Euclidean distance between two $q_f$s in the k-dimensional vector space may be computed as follows:

$$TDist(q_a, q_b) = \sqrt{\Sigma_{i=0}^{k-1} (v'_{ai} - v'_{bi})^2},$$

where $v'_{ai}$ is the ith element in $q^f_a$ and $v'_{bi}$ in $q^f_b$.

The Euclidean distance between two queries may be used to determine to what extent those queries are related. Queries are more likely to be related to one another when the Euclidean distance between those queries is smaller. For example, $q_a$ is more likely to be related to $q_b$ as $TDist(q_a, q_b)$ approaches zero. This is unlike the click graph relationships discussed above in which a higher value for L1Sim, L2Sim, or L3Sim indicates an increased likelihood that two queries are related, and a zero value indicates a lack of relationship (i.e., there is no overlap in the clicked search results for the queries). This approach to determining the Euclidean distance between two searches is also distinguishable from existing temporal similarity measures in that this scheme factors in the temporal proximity of peaks and favors queries whose peaks occur closer in time.

Each of the two methods for analyzing query relationships discussed herein may provide unique advantages, but also may suffer from disadvantages when utilized alone. For example, determining the layer one relatedness of two queries using a click graph may provide high precision. Unfortunately, the sparseness of a query click graph may result in poor recall at layer one. By employing layer two and layer three click graph analysis, a larger number of queries may be identified as related. Extending the analysis to layers two and three, however, may cause a decrease in the precision of the analysis.

Similarly, temporal query frequency analysis may have advantages and disadvantages as well. Temporal query frequency analysis may identify query relationships that would not be identified using click graph analysis due to the sparseness of click graphs directed to queries covering certain subject matter. There is also, however, a higher risk of false positives (i.e., low precision) associated with temporal query frequency analysis. For example, the "Westminster Dog Show" and "Valentine's Day" occur within days of each other every year, so they have a small temporal distance from one another, but these occurrences (and searches related thereto) are not topically related to one another.

The advantages of these two approaches may be combined, while diminishing the effects associated with the above-mentioned disadvantages, by combining the two approaches. Analyzing the relationships between queries based on both query-URL bipartite graph (i.e., click graph) analysis and temporal query frequency analysis may result in a significant increase in recall of search results at the expense of only a small loss in precision. Accordingly, two queries, $q_a$ and $q_b$, may be determined to be related if they satisfy the following exemplary conditions:

$L1\text{Sim}(q_a,q_b)>0$ $T\text{Dist}(q_a,q_b)<10$ $L2\text{Sim}(q_a,q_b)>0$ and $T\text{Dist}<50$ $L3\text{Sim}(q_a,q_b)>0$ and $T\text{Dist}<25$ By analyzing query relatedness based on a combined approach, as described above, a larger number of queries may be identified as related without significant sacrifices in precision. The first two conditions listed above may be considered as relatively strict: the first condition restricts click graph analysis to layer one only, and the second restricts temporal query frequency analysis to a short distance. Although these conditions may result in the identification of fewer query relationships, the relationships that meet these conditions are very likely truly to be topically related. The third and fourth listed conditions expand the click graph analysis out to layers two and three and also expand the distance under consideration for temporal query frequency analysis. The click graph and temporal analyses of conditions three and four, however, are combined, thus allowing for the identification of a larger number of query relationships without sacrificing precision.

Figure 5:
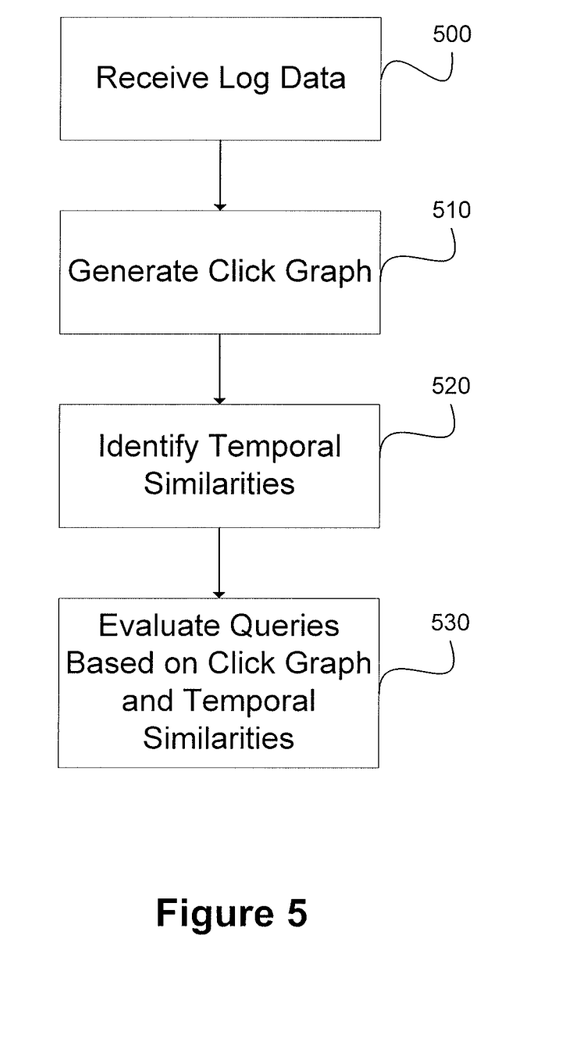
FIG. 5 illustrates a flow diagram of an exemplary method for analyzing query relationships using a click graph and temporal analyses, in accordance with an embodiment of the present disclosure.

FIG. 5 depicts a flow diagram of an exemplary method, consistent with an embodiment of the present disclosure. The exemplary method of FIG. 5 may be implemented to perform a query relationship analysis using the above-described combined approach. Further, in accordance with certain embodiments, the steps illustrated in FIG. 5 may be performed using various elements of system 106. For example, log data may be gathered by log pull server 302 from search engines and servers 150, 152, 154, and 156. This data may be processed in processing engine 304 to generate click graphs, identify temporal similarities between queries, and evaluate queries to identify query relationships. As will be appreciated, other components and system environments may also be used to implement the exemplary method and steps of FIG. 5.

As shown in FIG. 5, the method begins at step 500, in which log data pertaining to a plurality of queries is received from Internet users and stored in a storage medium. Among other things, this log data may contain information regarding queries performed by the users, results received in response to those queries, and information regarding which results were further explored by the users (e.g., which URLs in the results were clicked by the users). For example, in an embodiment, this information may be derived from search engines 150 and/or other engines and servers 152, 154, and 156. As shown in FIG. 1, the data may be collected by log pull server 302, and then processed, as further discussed below with reference to steps 510-530, by processing engine 304.

Specifically, at step 510, a click graph is generated representing one or more relationships between at least one pair of the queries included in the log data provided by log pull server 302. As discussed above, the click graph may contain representations of queries performed by Internet users, visited query results associated with each query, and links showing the relationships between the queries and query results. Temporal similarities between the queries described in the log data, including those represented by the click graph and any others, may be identified at step 520. Queries may then be evaluated at step 530 based on the generated click graph and identified temporal similarities so that relationships among the queries may be determined. For example, two queries may be identified as related queries if the first layer (click graph) similarity for those two queries is determined to be greater than zero or if the temporal distance between those two queries is determined to be less than a first threshold value, such as 10. A pair of queries may also be identified as related to one another based on a combination of their second or third layer (click graph) similarity to one another and temporal distance from one another (e.g., two queries may be identified as related if their second layer similarity is greater than zero and their temporal distance is less than a second threshold value, such as fifty), as discussed above.

The output of this combined analysis may provide useful information to a variety of customers. Search engines may use this information to provide search recommendations, such that their users may discover the information they are seeking more quickly. Further, the information identified according to the method of FIG. 5 may be used to identify and describe trending topics more effectively, as the same topic may often be expressed in different query terms. Moreover, knowledge of related queries may be helpful for keyword advertising and search optimization.

FIG. 6 illustrates another exemplary system environment for implementing embodiments of the present disclosure, including the exemplary method of FIG. 5. As shown in FIG. 6, a system 600 is provided for analyzing search query relationships. System 600 may comprise a number of components interconnected via an electronic network 610, such as the Internet or any other combination of networks (e.g., public and private/local networks). For example, system 600 may include one or more data sources 620, a data processing system 630, a database 640, a content management system 650, and one or more data consumers 660. Although FIG. 6 illustrates an exemplary arrangement of these components, it will be appreciated that the number and arrangement of these components may be modified according to the needs of the implementation or system environment. Moreover, an suitable combination of hardware, software, and/or firmware may be used implementing or instantiating each of the components of FIG. 6.

By way of example, consistent with the present disclosure, the components of system 600 may include one or more server systems, databases, and/or computing systems configured to receive information via network 610, process the information, and/or communicate the information with other components via network 610. In accordance with certain embodiments, the components of system 600 may include an assembly of hardware, software, and/or firmware, including a memory, a CPU, and/or a user interface. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

In the exemplary embodiment of FIG. 6, information (e.g., log data) pertaining to user search queries may be collected and transferred from one or more data sources 620 over the electronic network 610 to data processing system 630 for analysis. Data sources 620 may comprise with one or more search engines, ad servers, emails servers, web servers, and/or other sources capable of collecting information on user queries. Data processing system 630 may be implemented as a dedicated processing system for data and include one or more servers or server clusters. In one embodiment, data processing system 630 may be implemented as a distributed processing system. Additionally, data processing system 630 may be implemented as part of or independently of a content management system, such as content management system 650.

Data processing system 630 may perform a number of analyses on the received data (e.g., generating click graphs, identifying temporal similarities, and evaluating and identifying query relationships) and store information pertaining to these analyses in database 640. The processing and analysis on the received data may be carried in accordance with the exemplary methods and features disclosed herein. The results of these analyses may be forwarded to content management system 650, as well as data consumers 660, for various applications (e.g., identifying trending topics, keyword advertising, and search optimization). In one embodiment, the results of the analyses may be used by content management system 650 to control and manage electronic content, such as content presented, offered, or otherwise made available on or more web sites. In another embodiment, the results of the analyses is made available via an online interface, customized reports, and/or other formats to data consumers 660, such as researchers, analysts, and business and sales entities.

In this disclosure, various preferred embodiments have been described with reference to the accompanying drawings. It will, however, be evident that various modifications and changes may be made thereto, and additional embodiments may be implemented, without departing from the broader scope of the invention as set forth in the claims that follow.

The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

Therefore, it is intended that the disclosed embodiments and examples be considered as exemplary only, with a true scope of the present disclosure being indicated by the following claims and their equivalents.

What is claimed is:

1. A method for analyzing search query relationships, the method comprising the following operations performed by one or more processors:

receiving, over an electronic network, log data relating to a plurality of search queries received from users;

generating a click graph representing relationships among a plurality of queries and a plurality of visited query results associated with each of the plurality of queries,
wherein the click graph depicts at least one first layer relationship between a first query and a second query in the plurality of queries, the first layer relationship indicating that at least one of the plurality of visited query results is associated with both the first query and the second query, and
further wherein the click graph depicts at least one second layer relationship between the first query and second query in the plurality of queries, the second layer relationship indicating that each of the first and second queries has a first layer relationship to a third query;

computing a numeric value representing a degree of the at least one second layer relationship;

identifying temporal similarities between at least one pair of the plurality of queries, the temporal similarities determined based on a temporal distance between peaks in frequency of occurrence for both queries in the at least one pair of the plurality of queries;

evaluating the at least one pair of queries based on the generated click graph and the identified temporal similarities to determine whether the at least one pair of queries are related; and designating the queries in the at least one pair of queries as related based on the computed value being greater than zero and the temporal distance being below a threshold value.

2. The computer-implemented method of claim 1, wherein the click graph depicts at least one third layer relationship between the first query and the second query in the plurality of queries, the third layer relationship indicating that each of the first and second queries has at least one of a first layer relationship and a second layer relationship to the third query.

3. The computer-implemented method of claim 2, wherein evaluating the at least one pair of queries comprises:

computing a numeric value representing a degree of the at least one third layer relationship; and designating the queries in the at least one pair of queries as related based on:

at least one of the computed value representing the degree of the at least one second layer relationship and the computed value representing the degree of the at least one third layer relationship being greater than zero; and the temporal distance being below a threshold value.

4. The computer-implemented method of claim 1, wherein the temporal distance is a Euclidean distance.

5. The computer-implemented method of claim 1, wherein identifying temporal similarities comprises computing a time series for each query in the at least one pair of the plurality of queries, the time series indicating a query frequency at each of a plurality of times.

6. The computer-implemented method of claim 5, further comprising performing at least one of normalizing, coarsening, and flattening on each computed time series.

7. The computer-implemented method of claim 5, further comprising normalizing, coarsening, and flattening each computed time series.

8. The computer-implemented method of claim 1, further comprising, based on the evaluation, designating the queries in the at least one pair of queries as related.

9. The computer-implemented method of claim 1, wherein evaluating the at least one pair of queries comprises:
   computing a value representing a first layer similarity between the queries in the at least one pair of queries; and
   designating the queries in the at least one pair of queries as related if the computed value is greater than zero.

10. The computer-implemented method of claim 1, wherein evaluating the at least one pair of queries comprises:
    computing the temporal distance between the queries in the at least one pair of queries; and
    designating the queries in the at least one pair of queries as related if the computed temporal distance is below a threshold value.

11. A system for analyzing search query relationships, the system comprising:
    a server configured to receive, over an electronic network, log data relating to a plurality of search queries received from users; and
    a processor configured to:
       generate a click graph representing relationships among a plurality of queries and a plurality of visited query results associated with each of the plurality of queries, wherein the click graph depicts at least one first layer relationship between a first query and a second query in the plurality of queries, the first layer relationship indicating that at least one of the plurality of visited query results is associated with both the first query and the second query, and further wherein the click graph depicts at least one second layer relationship between the first query and second query in the plurality of queries, the second layer relationship indicating that each of the first and second queries has a first layer relationship to a third query;
       compute a numeric value representing a degree of the at least one second layer relationship;
       identify temporal similarities between at least one pair of the plurality of queries, the temporal similarities determined based on a temporal distance between peaks in frequency of occurrence for both queries in the at least one pair of the plurality of queries;
       evaluate the at least one pair of queries based on the generated click graph and the identified temporal similarities to determine whether the at least one pair of queries are related; and
       designate the queries in the at least one pair of queries as related based on the computed value being greater than zero and the temporal distance being below a threshold value.

12. The system of claim 11, wherein the click graph depicts at least one third layer relationship between the first query and the second query in the plurality of queries, the third layer relationship indicating that each of the first and second queries has at least one of a first layer relationship and a second layer relationship to the third query.

13. The system of claim 12, wherein evaluating the at least one pair of queries comprises:
    computing a numeric value representing a degree of the at least one third layer relationship; and
    designating the queries in the at least one pair of queries as related based on:
       at least one of the computed value representing the degree of the at least one second layer relationship and the computed value representing the degree of the at least one third layer relationship being greater than zero; and
       the temporal distance being below a threshold value.

14. The system of claim 11, wherein the temporal distance is a Euclidean distance.

15. The system of claim 11, wherein identifying temporal similarities comprises computing a time series for each query in the at least one pair of the plurality of queries, the time series indicating a query frequency at each of a plurality of times.

16. The system of claim 15, wherein the processor is further configured to perform at least one of normalizing, coarsening, and flattening on each computed time series.

17. The system of claim 15, wherein the processor is further configured to perform normalizing, coarsening, and flattening each computed time series.

18. The system of claim 11, wherein the processor is further configured to, based on the evaluation, designate the queries in the at least one pair of queries as related.

19. The system of claim 11, wherein evaluating the at least one pair of queries comprises:
    computing a value representing a first layer similarity between the queries in the at least one pair of queries; and
    designating the queries in the at least one pair of queries as related if the computed value is greater than zero.

20. The system of claim 11, wherein evaluating the at least one pair of queries comprises:
    computing the temporal distance between the queries in the at least one pair of queries; and
    designating the queries in the at least one pair of queries as related if the computed temporal distance is below a threshold value.

21. A computer-readable storage medium including instructions for analyzing search query relationships, which, when executed by at least one processor, cause the processor to perform steps comprising:
    receiving, over an electronic network, log data relating to a plurality of search queries received from users;
    generating a click graph representing relationships among a plurality of queries and a plurality of visited query results associated with each of the plurality of queries, wherein the click graph depicts at least one first layer relationship between a first query and a second query in the plurality of queries, the first layer relationship indicating that at least one of the plurality of visited query results is associated with both the first query and the second query, and further wherein the click graph depicts at least one second layer relationship between the first query and second query in the plurality of queries, the second layer relationship indicating that each of the first and second queries has a first layer relationship to a third query;

computing a numeric value representing a degree of the at least one second layer relationship;

identifying temporal similarities between at least one pair of the plurality of queries, the temporal similarities determined based on a temporal distance between peaks in frequency of occurrence for both queries in the at least one pair of the plurality of queries;

evaluating the at least one pair of queries based on the generated click graph and the identified temporal similarities to determine whether the at least one pair of queries are related; and designating the queries in the at least one pair of queries as related based on the computed value being greater than zero and the temporal distance being below a threshold value.

22. The computer-readable storage medium of claim 21, wherein the step of generating a click graph comprises generating a click graph depicting at least one third layer relationship between the first query and the second query in the plurality of queries, the third layer relationship indicating that each of the first and second queries has at least one of a first layer relationship and a second layer relationship to the third query.

23. The computer-readable storage medium of claim 21, further comprising the step of, based on the evaluation, designating the queries in the at least one pair of queries as related.

24. The computer-readable storage medium of claim 22, wherein the step of evaluating the at least one pair of queries comprises:

computing a numeric value representing a degree of the at least one third layer relationship; and designating the queries in the at least one pair of queries as related based on:

at least one of the computed value representing the degree of the at least one second layer relationship and the computed value representing the degree of the at least one third layer relationship being greater than zero; and the temporal distance being below a threshold value.

25. The computer-readable storage medium of claim 21, wherein the temporal distance is a Euclidean distance.

26. The computer-readable storage medium of claim 16, wherein the step of identifying temporal similarities comprises computing a time series for each query in the at least one pair of the plurality of queries, the time series indicating a query frequency at each of a plurality of times.

27. The computer-readable storage medium of claim 26, further comprising the step of performing at least one of normalizing, coarsening, and flattening on each computed time series.

28. The computer-readable storage medium of claim 26, further comprising the step of normalizing, coarsening, and flattening each computed time series.

29. The computer-readable storage medium of claim 21, wherein the step of evaluating the at least one pair of queries comprises:

computing a value representing a first layer similarity between the queries in the at least one pair of queries; and designating the queries in the at least one pair of queries as related if the computed value is greater than zero.

30. The computer-readable storage medium of claim 21, wherein the step of evaluating the at least one pair of queries comprises:

computing the temporal distance between the queries in the at least one pair of queries; and designating the queries in the at least one pair of queries as related if the computed temporal distance is below a threshold value.

* * * * *